Oct. 18, 1927.
H. A. THRUSH
1,645,886
TEMPERATURE DAMPER REGULATOR
Filed Feb. 3, 1926
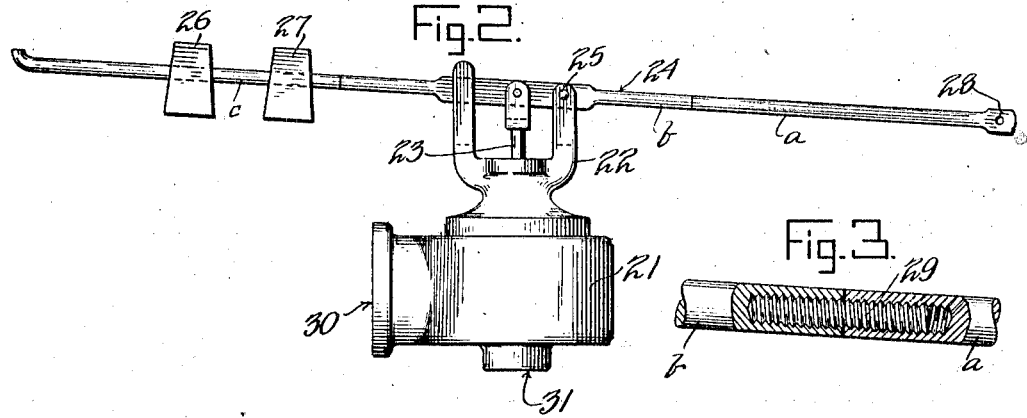
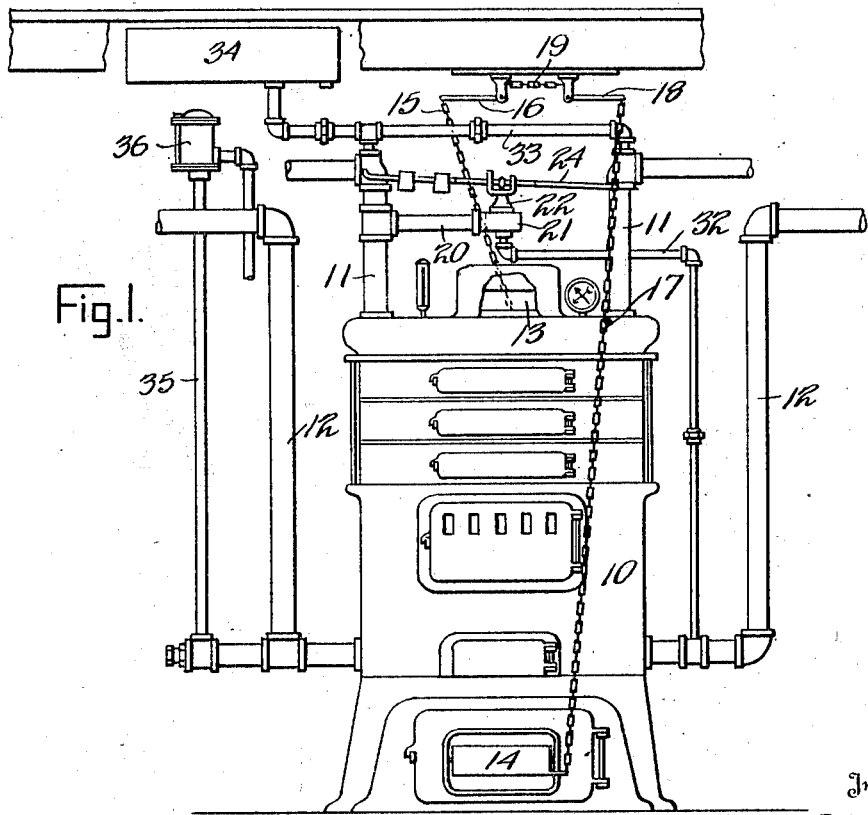
Inventor
Homer A. Thrush
By *[signature]*
Attorney Patented Oct. 18, 1927.

1,645,886

UNITED STATES PATENT OFFICE.

HOMER A. THRUSH, OF PERU, INDIANA.

TEMPERATURE DAMPER REGULATOR.

Application filed February 3, 1926. Serial No. 85,786.

My said invention relates to a temperature damper regulator for heating plants and it is an object of the same to simplify the construction of such devices and render them more convenient in use and less expensive in transportation.

Referring to the accompanying drawings which are made a part hereof and on which similar reference characters indicate similar parts, Fig. 1 is a front elevation of the principal elements of a heating plant, Fig. 2, a similar elevation of parts shown in Fig. 1, this view being on an enlarged scale, and Fig. 3, a detail of parts shown in Fig. 2, on a still larger scale.

In the drawings reference character 10 indicates a furnace which may be of the hot water type having outgoing pipes 11 and return pipes 12. The furnace is provided with an upper damper 13 and a lower damper 14 in the door of the ash pit. The damper 13 is connected by a chain 15 to a crank 16 and the damper 14 is connected by a chain 17 to a crank 18. A chain 19 connects vertical arms of the two cranks.

A pipe 20 extends from one of the outgoing pipes 11 to a damper regulator 21 controlled by temperature or pressure of the heating fluid. A yoke 22 is located upon the body of the regulator 21 and a rod 23 connected to a movable element, such as a diaphragm, in the body of the regulator is pivotally secured to a regulator lever 24 pivoted at 25 on one arm of the yoke. The lever is made preferably from round stock flattened at intervals which renders it convenient to make the lever in sections and yet provide for smooth surfaces without irregularities whereby the weights hereinafter referred to may be slid back and forth on the lever without difficulty. At one side of the pivot the lever may carry a plurality of weights 26, 27 mounted for convenient adjustment along one arm of said lever and at the outer end of the other arm it is pivotally connected at 28 to the chain 17. The regulator lever, as ordinarily manufactured, is cumbersome and awkward to ship as it either requires a long separate package, or else fits in awkwardly with other elements of the regulator. To avoid such difficulty in shipment I have made the regulator lever in sections, here shown as three in number.

Figure 3 illustrates the construction of the joints between the two sections $a$ and $b$. As shown in this figure each of the sections has an internally threaded opening extending axially thereof and a threaded stud 29 is screwed into the openings in adjacent ends of the sections and thereby parts of the lever are rigidly but detachably connected to each other and can readily be put together or taken apart for shipment or storage.

The body 21 has a threaded opening at one side as indicated at 30 for convenient connection by a pipe such as 20 to an outgoing pipe 11. At its underside an opening is provided at 31 for convenient attachment of a circulating pipe 32 which is also connected to downgoing pipe 12 in cases where such a circulating pipe is deemed desirable.

It may be added that all other similar regulators so far as I am aware must be connected to openings such as are provided directly in boilers of some varieties, or else threaded directly to the flow pipes whereas my device may be connected by intermediate pipes in any convenient or desirable manner to the flow pipes so as to secure the greatest efficiency. This also makes it possible to locate the body of the regulator in such a position that the chains extending to the various dampers or draft controlling devices can be arranged in the most efficient manner to give the best possible results.

In most cases the regulator can be installed without any circulating pipe, it being simply connected to one of the flow risers with a short nipple in place of the pipe 20 indicated in Figure 1 and this will give sufficient variation of pressure for moving the element 22 and the parts connected therewith to suit the purposes of my invention. This simplifies the work of installation and also supplies a limited selection or adjustment for the proper location or position of the regulator so that it may be connected in the most advantageous manner to the chains which operate the draft dampers. In some instances the regulator will have to be set a considerable distance away from the flow pipes, it being remembered that the position of my device is not arbitrarily fixed as in the case of other regulating devices. When this is the case the circulating pipe 32 may be utilized, there being a place for attachment of this pipe at 31 as previously set forth. Inclusion of the circulating pipe will cause sufficient circulation through the regulator to insure appropriate operation of the element 22, the sectional lever, etc.

It may be noted that the flow pipes are connected by pipes 33 leading to an airtight pressure tank 34 and that the return pipes are connected by a pipe 35 to a differential pressure relief device 36.

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. In a heating plant, a furnace having draft-controlling means, a pressure-operated regulator therefor, a sectional regulator-lever operated by a movable element of the regulator, flexible connections from said lever to said controlling devices, and means for varying the resistance of said lever to the pressure of said controller, substantially as set forth.

2. In a heating plant, a furnace having draft-controlling means, a pressure-operated regulator therefor having a hollow body connected to an outgoing circulating pipe for the heating medium, a pressure-responsive element on said body, connections from said element to said draft-controlling means, and a circulation pipe leading from the bottom of the body to a return pipe for the heating medium, substantially as set forth.

3. The combination in a heating plant of a smooth regulator lever comprising a rod formed of a plurality of separable sections, an intermediate section being flattened for pivotal connection with a pressure operated regulator, and weights slidable on said lever, substantially as set forth.

4. A regulator lever for a heating plant comprising a smooth rod formed of a plurality of separable sections, an intermediate section being flattened for pivotal connection with a pressure operated regulator, said sections being provided at their contiguous ends with internally threaded openings, stubs threaded into said openings for connecting them rigidly together and weights slidable freely on said lever over the joints between sections thereof, substantially as set forth.

5. The combination of a furnace having draft control means, a boiler associated with said furnace, an outlet pipe for conducting heating fluid from the upper portion of said boiler to radiators, a branch pipe and arranged to be secured in a plurality of positions connected to said outlet pipe, a pressure operated regulator for said draft control means connected to said branch pipe, a yoke on said regulator, a lever pivoted on one arm of the yoke, the other arm of said yoke forming a guide for said lever, a rod having one end pivoted to said lever between the arms of the yoke and having its other end connected to the movable element of the regulator, chains connecting one arm of said lever to said draft controlling means and adjustable weights on the other arm of the lever, substantially as set forth.

6. The combination of a furnace having draft controlling means, a boiler associated with said furnace, an outlet pipe for conducting heating fluid from the upper portion of said boiler to radiators, a branch pipe having one end connected to said outlet pipe and arranged to be secured in a plurality of positions, said branch pipe having its other end communicating with the boiler below the connection with the branch pipe, a pressure operated regulator for said draft controlling means inserted in said branch pipe, a yoke on said regulator having a pair of bifurcated ends, a lever pivoted in one of said bifurcated ends of the yoke and extending through the bifurcation and the opposite end of the lever, whereby the same is held against any movement about a vertical pivot, a rod having one end pivoted to said lever between the arms of the yoke and having its other end connected to the movable element of the regulator, a chain connecting a plurality of drafts, said chain being connected to said lever and weights on said lever adapted to hold said chain and drafts in a certain position, but being adapted to be operated by the movable element of the regulator for causing the drafts to assume a different position, substantially as set forth.

In witness whereof, I have hereunto set my hand and seal at Peru, Indiana this 30th day of January, A. D. nineteen hundred and twenty-six.

HOMER A. THRUSH.